United States Patent
Dong et al.

(10) Patent No.: US 7,232,289 B2
(45) Date of Patent: Jun. 19, 2007

(54) SHROUD FOR AN AIR TURBINE STARTER

(75) Inventors: Paulynn Dong, Chandler, AZ (US);
Kellan P. Geck, Chandler, AZ (US);
David M. Mathis, Phoenix, AZ (US);
James A. Hall, Gilbert, AZ (US);
David P. Gentile, Chandler, AZ (US);
Jennifer L. Zonneveld, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 142 days.

(21) Appl. No.: 11/128,644

(22) Filed: May 12, 2005

(65) Prior Publication Data
US 2006/0257253 A1   Nov. 16, 2006

(51) Int. Cl.
*F01D 1/02* (2006.01)
(52) U.S. Cl. ........................ 415/206; 415/220
(58) Field of Classification Search ................ 415/206, 415/207, 220
See application file for complete search history.

(56) References Cited
U.S. PATENT DOCUMENTS

| | | | |
|---|---|---|---|
| 4,212,585 A * | 7/1980 | Swarden et al. ........... 415/58.6 |
| 4,581,300 A * | 4/1986 | Hoppin et al. ............... 428/546 |
| 4,786,238 A * | 11/1988 | Glaser et al. .................. 417/53 |
| 5,527,403 A | 6/1996 | Schirra et al. |
| 5,592,813 A | 1/1997 | Webb |
| 5,887,822 A | 3/1999 | Thornock et al. |
| 5,947,684 A | 9/1999 | Kato et al. |
| 6,428,268 B1 * | 8/2002 | Addie et al. .................... 415/1 |
| 6,634,413 B2 | 10/2003 | Ray et al. |
| 6,637,186 B1 | 10/2003 | Van Duyn |
| 6,758,437 B1 | 7/2004 | Lane et al. |
| 6,899,522 B2 * | 5/2005 | Baur et al. ............... 415/216.1 |
| 6,968,697 B2 * | 11/2005 | Nguyen et al. ............... 60/772 |
| 2003/0116242 A1 | 6/2003 | Harrison et al. |
| 2004/0022949 A1 | 2/2004 | Hasezaki et al. |

\* cited by examiner

*Primary Examiner*—Edward K. Look
*Assistant Examiner*—Devin Hanan
(74) *Attorney, Agent, or Firm*—Ingrassia Fisher & Lorenz

(57) ABSTRACT

A shroud is provided for separating an air turbine starter housing from a turbine wheel. The shroud comprises a ring and a bumper. The ring is configured to be disposed between the turbine wheel and the housing and has an outer peripheral surface and an inner peripheral surface that defines a flow channel. The bumper is coupled to and extends radially inwardly from the ring inner peripheral surface and defines a bumper section of the ring flow channel. At least a portion of the bumper section has a cross-sectional flow area that is less than another cross sectional flow area of the ring flow channel.

18 Claims, 2 Drawing Sheets

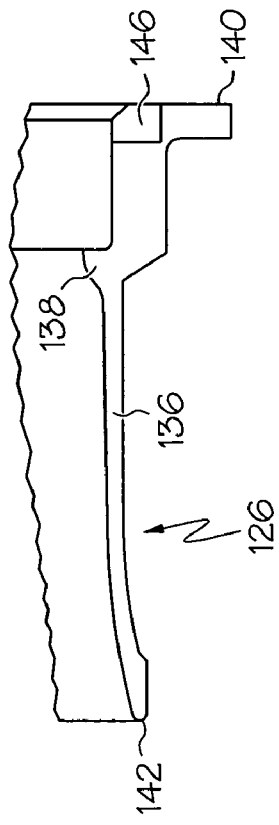
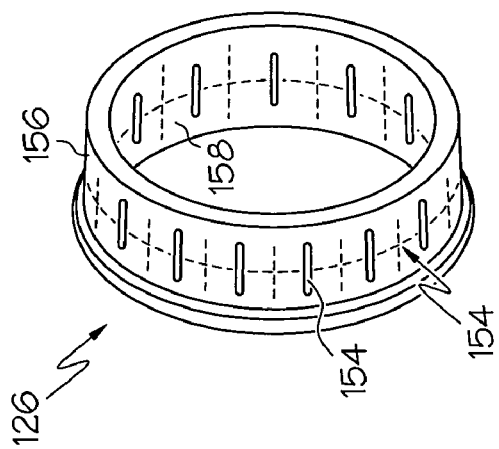
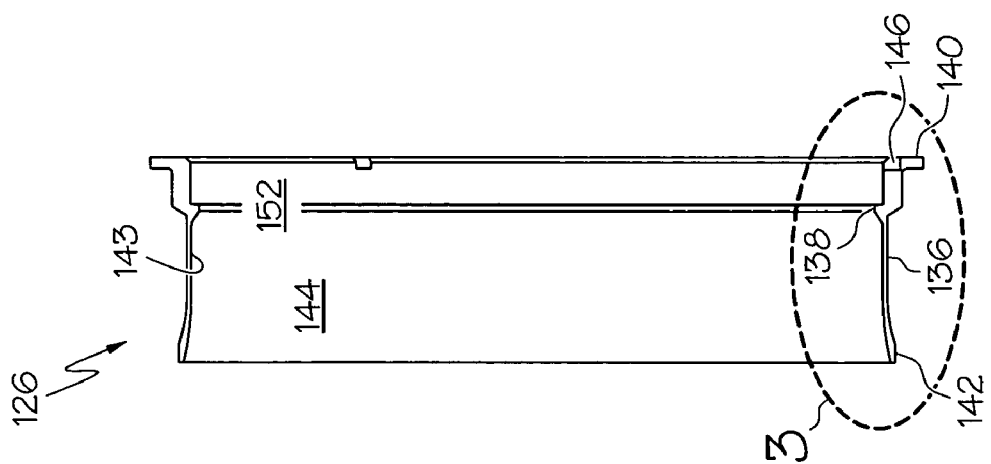

SHROUD FOR AN AIR TURBINE STARTER

TECHNICAL FIELD

The present invention relates to air turbine starters and, more particularly, to a shroud for use with a turbine wheel of an air turbine starter.

BACKGROUND

Many relatively large turbine engines, including turbofan engines, may use an air turbine starter (ATS) to initiate turbine engine rotation. Typically, the ATS includes at least a turbine section coupled to an output section that are each mounted within an aluminum ATS housing. The turbine section is also coupled to a high pressure fluid source, such as compressed air, and includes a turbine wheel and an output shaft. The turbine wheel has a hub with a plurality of blades extending radially therefrom. The output shaft extends axially from the hub and is coupled to the output section. Thus, when the high pressure fluid source impinges upon the turbine blades, the output shaft rotates at a relatively high rate of speed to power the turbine engine.

In many instances, the turbine blades are constructed of a high-strength material capable of withstanding the high speeds encountered during aircraft operation, such as, for example, titanium. To allow the turbine wheel to produce the maximum amount of power for optimal ATS operation and to abide by size restrictions, a reduced clearance is usually provided between the turbine blades and the ATS housing.

Although the above configuration is generally safe and effective, it may have certain drawbacks. For example, during operation, the turbine blades may rub against the housing and cause friction. During normal ATS operating conditions, such as when the ATS is operating at temperatures below 600° F., the contact between the blades and housing may not adversely affect ATS operability; however, in instances in which the fluid source temperatures exceeds 600° F., this may not be the case. In particular, the aluminum housing may lose structural integrity, which may cause inoperability of the ATS. Additionally, the turbine wheel may become displaced from its original position, and, for example, may inadvertently travel axially through the ATS, and, consequently, may damage other components of the ATS, such as a stator.

Accordingly, there is a need for an air turbine starter that is operational and capable of maintaining structural integrity at temperatures above 600° F. In addition, there is a need for an air turbine starter that is lightweight and relatively inexpensive to implement. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides a shroud for separating a turbine wheel from a housing. In one embodiment, and by way of example only, the shroud comprises a ring and a bumper. The ring is configured to be disposed between the turbine wheel and the housing and has an outer peripheral surface and an inner peripheral surface that defines a flow channel. The bumper is coupled to and extends radially inwardly from the ring inner peripheral surface and defines a bumper section of the ring flow channel. At least a portion of the bumper section has a cross-sectional flow area that is less than another cross sectional flow area of the ring flow channel.

In another embodiment, and by way of example only, the ring comprises a nickel-based superalloy.

In yet another embodiment, and by way of example only, an air turbine starter is provided. The air turbine starter includes a starter housing, a shaft, a turbine wheel, and a shroud. The shaft is rotationally mounted within the starter housing. The turbine wheel is mounted to the shaft. The shroud is coupled to the starter housing. The shroud comprises a ring and a bumper. The ring is configured to be disposed between the turbine wheel and the housing and has an outer peripheral surface and an inner peripheral surface that defines a flow channel. The bumper is coupled to and extends radially inwardly from the ring inner peripheral surface and defines a bumper section of the ring flow channel. At least a portion of the bumper section has a cross-sectional flow area that is less than another cross sectional flow area of the ring flow channel.

Other independent features and advantages of the preferred shroud will become apparent from the following detailed description, taken in conjunction with the accompanying drawings which illustrate, by way of example, the principles of the invention.

BRIEF DESCRIPTION OF THE DRAWINGS

FIG. 2 is a cross sectional view of the exemplary shroud depicted in FIG. 1;

FIG. 3 is a close up view of a portion of the exemplary shroud depicted in FIG. 2; and FIG. 4 is an isometric view of the exemplary shroud depicted in FIG. 1.

DETAILED DESCRIPTION OF A PREFERRED EMBODIMENT

Figure 1:
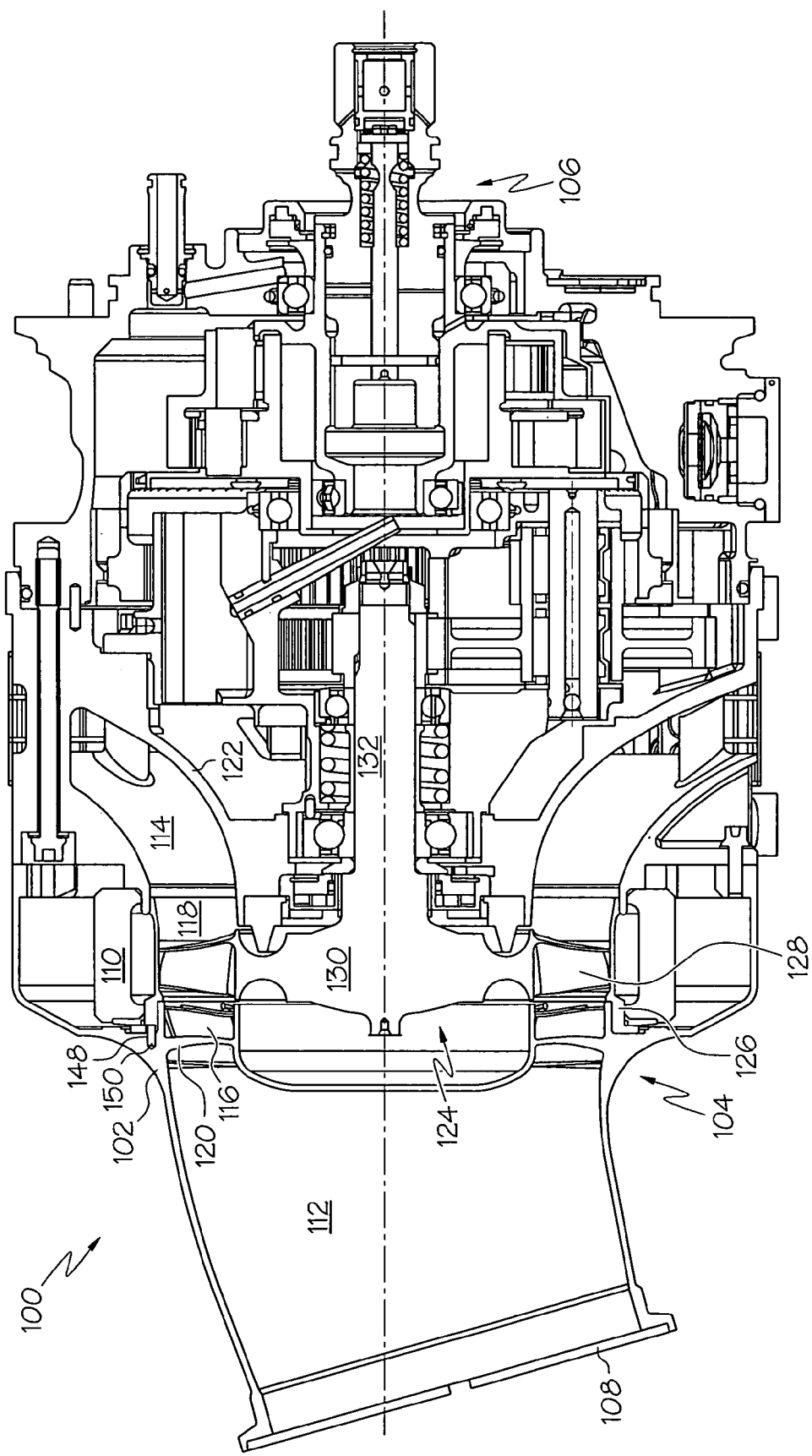
FIG. 1 is a cross sectional view of an air turbine starter (ATS) having an exemplary shroud coupled thereto.

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, a gas turbine engine, a hydraulic pump, a water pump, or various other chemical and industrial pumps.

Turning now to the description, a cross sectional view is depicted in FIG. 1 of an exemplary air turbine starter (ATS) that is used to initiate the rotation of a larger turbine, such as a turbofan engine. The ATS 100 is enclosed within a housing assembly 102 that includes at least a turbine section 104 and an output section 106.

The housing assembly 102 may be made up of two or more parts that are combined together or may be integrally formed as a single piece. In the depicted embodiment, the housing assembly 102 includes an inlet plenum 108 and a containment ring 110. The inlet plenum 108 receives and directs compressed air into the housing assembly 102 which is driven through an annular flow channel 112 and out a radial outlet port 114. The annular flow channel 112 includes an axial flow portion 116 and a substantially curved radial flow portion 118. The axial flow portion 116 is formed through a stator assembly 120 that is mounted within the housing assembly turbine section 104 proximate the inlet plenum 108. The radial flow portion 118, which flares the annular flow channel 112 radially outwardly, is formed between a portion of the housing assembly turbine section 104 and an exhaust housing 122 that is mounted to the housing assembly 102. The containment ring 110 is formed in the housing assembly 102 and is configured to receive debris that may travel through the axial and radial flow portions 116, 118. In this regard, the containment ring 110 is preferably recessed from the axial and radial flow portions 116, 118.

The turbine section 104 includes a turbine wheel 124 and a shroud 126. The turbine wheel 124 is rotationally mounted within the turbine section 104 and is constructed of a high-strength material that is capable of maintaining structural integrity at temperatures of at least 1000° F. In one exemplary embodiment, the turbine wheel 124 comprises titanium or alloys thereof. The turbine wheel 124 has a plurality of blades 128, a hub 130, and an output shaft 132. The blades 128 extend radially from the hub 130, and the output shaft 132 extends axially from the hub 130. The output shaft 132 extends through the exhaust housing 122 and into the housing assembly output section 106, and is coupled to a turbine output shaft 132 disposed within the output section 106 via gears (not shown).

The shroud 126 is configured to serve as a wall between the blades 128 and the housing assembly 102. In this regard, the shroud 126 is disposed between the turbine wheel 124 and the containment ring 110 of the housing assembly 102. Preferably, the shroud 126 is coupled to the housing 102. It will be appreciated that any one of numerous manners by which to couple the shroud 126 to the ATS 100 may be employed. For example, the shroud 126 may be bolted to, threaded into, slip fit against, or, as shown in FIG. 1, interference-fit into the housing assembly 102. The shroud 126 is preferably constructed of a material that is capable of maintaining structural integrity and combustion-resistance if the rotating turbine wheel 124 rubs against the shroud 126 while the turbine wheel 124 is rotating and the ATS 100 is operating at temperatures greater than 600° F. Examples of suitable materials include, but are not limited to, nickel-based superalloys, such as precipitation-hardenable nickel-chromium alloys, iron-based superalloys, stainless steels, or other high temperature compatible materials.

With reference now to FIGS. 2 and 3, cross section views of an exemplary shroud 126 that may be implemented into the ATS 100 are provided. The shroud 126 includes a ring 136 and a bumper 138. The ring 136 is configured to surround the turbine wheel 124 and has an inlet end 140, an outlet end 142, and an inner peripheral surface 143 that defines a flow channel 144. The inlet end 140 may include at least one notch 146 formed therein that corresponds to an opening 148 (shown in FIG. 1) formed in the housing assembly 104. A pin 150 (also shown in FIG. 1) is disposed within the notch 146 and opening 148 to prevent rotation of the shroud 126 in the unlikely event it contacts a rotating turbine wheel 124. Although only one notch 146 and one opening 148 are shown in the figures, it will be appreciated that more may be implemented.

Preferably, the bumper 138 extends radially inwardly from the inner peripheral surface 143 and is configured to prevent the turbine wheel 124 from contacting the stator assembly 120. It will be appreciated that the bumper 138 may be integrally formed as part of the ring 136, or alternatively, the bumper 138 may be separately formed and subsequently attached to the ring 136. Additionally, the configuration of the bumper 138 defines a bumper section 152 of the flow channel 144, a portion of which has a cross-sectional flow area that is less than another cross sectional flow area of the flow channel 144.

In another exemplary embodiment, the shroud 126 may further include grooves 154, as illustrated in FIG. 4. The grooves 154 are configured to increase the frangibility of the shroud 126 in certain areas. Thus, in the highly unlikely event that the turbine wheel 124 becomes damaged and a piece becomes detached therefrom, the piece may be directed toward the grooves 154 to create an opening in the shroud 126. The piece may then travel out of the shroud flow channel 144 and into the containment ring 110. The grooves 154 may have any suitable configuration for selectively reducing the structural integrity of the shroud 126. In one example, the grooves 154 may be slits that are formed in an outer peripheral surface 156 of the ring 136. The grooves 154 may be formed axially or radially, or alternatively, a combination of axially and radially formed grooves 154 may be employed. In another example, the grooves 154 are perforations that extend between an inner peripheral surface 158 and the outer peripheral surface 156 of the ring 136. Similar to the slits, the perforations may be axially and/or radially formed.

There has now been provided an air turbine starter that is operational and capable of maintaining structural integrity at temperatures above 600° F. In addition, the air turbine starter is lightweight and relatively inexpensive to implement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A shroud for separating a turbine wheel from a housing, the shroud comprising:
   a ring configured to be disposed between the turbine wheel and the housing, the ring having an anti-rotation notch, an outer peripheral surface, and an inner peripheral surface, the anti-rotation notch formed in the ring, and the inner peripheral surface defining a flow channel; and
   a bumper extending radially inwardly from the ring inner peripheral surface and defining a bumper section of the ring flow channel, at least a portion of the bumper section having a cross-sectional flow area that is less than another cross sectional flow area of the ring flow channel.

2. The shroud of claim 1, wherein the ring comprises a material selected from the group consisting of at least a nickel-based superalloy, a stainless steel alloy, and an iron-based superalloy.

3. The shroud of claim 2, wherein the nickel-based superalloy comprises a precipitation-hardenable nickel-chromium alloy.

4. The shroud of claim 1, wherein the ring has an end and the anti-rotation notch is formed in the end.

5. The shroud of claim 1, further comprising at least one groove formed in the ring outer peripheral surface.

6. The shroud of claim 5, wherein the at least one groove is formed axially along the ring outer peripheral surface.

7. The shroud of claim 5, wherein the at least one groove is formed radially along the ring outer peripheral surface.

8. The shroud of claim 5, wherein the at least one groove is formed from perforations that extend between the ring outer peripheral surface and the ring inner peripheral surface.

9. The shroud of claim 1, wherein the bumper is integrally formed as part of the ring.

10. A shroud for use in an air turbine starter having a titanium turbine wheel disposed within an aluminum housing, the shroud comprising:
   a ring configured to be disposed between the turbine wheel and the housing, the ring comprising a material selected from the group consisting of at least a nickel-based superalloy, a stainless steel alloy, and an iron-based superalloy and having an anti-rotation notch, an outer peripheral surface and an inner peripheral surface, the anti-rotation notch formed in the ring inlet end, and the inner peripheral surface defining a flow channel; and
   a bumper extending radially inwardly from the ring inner peripheral surface and defining a bumper section of the ring flow channel, at least a portion of the bumper section having a cross-sectional flow area that is less than another cross sectional flow area of the ring flow channel.

11. The shroud of claim 10, further comprising at least one groove formed in the ring outer peripheral surface.

12. The shroud of claim 11, wherein the at least one groove is formed from perforations that extend between the ring outer peripheral surface and the ring inner peripheral surface.

13. The shroud of claim 10, wherein the ring comprises a precipitation-hardenable nickel-chromium alloy.

14. An air turbine staffer comprising:
   a staffer housing;
   a shaft rotationally mounted within the staffer housing;
   a turbine wheel mounted to the shaft; and
   a shroud coupled to the staffer housing and disposed around the turbine wheel, the shroud comprising:
      a ring configured to be disposed between the turbine wheel and the housing, the ring having an anti-rotation notch, an outer peripheral surface, and an inner peripheral surface, the anti-rotation notch formed in the ring, and the inner peripheral surface defining a flow channel; and
      a bumper extending radially inwardly from the ring inner peripheral surface and defining a bumper section of the ring flow channel, at least a portion of the bumper section having a cross-sectional flow area that is less than another cross sectional flow area of the ring flow channel.

15. The air turbine staffer of claim 14, wherein the shroud is interference-fit into the staffer housing.

16. The air turbine staffer of claim 15, wherein:
   the ring has an end;
   the anti-rotation notch is formed on the ring end; and
   the air turbine staffer further comprises a pin coupled between the housing and the anti-rotation notch.

17. The air turbine staffer of claim 14, wherein the ring comprises a material selected from the group consisting of at least a nickel-based superalloy, a stainless steel alloy, and an iron-based superalloy.

18. The air turbine staffer of claim 17, wherein the nickel-based superalloy comprises a precipitation-hardenable nickel-chromium alloy.

* * * * *

UNITED STATES PATENT AND TRADEMARK OFFICE
CERTIFICATE OF CORRECTION

PATENT NO. : 7,232,289 B2 Page 1 of 1
APPLICATION NO. : 11/128644
DATED : June 19, 2007
INVENTOR(S) : Dong et al.

It is certified that error appears in the above-identified patent and that said Letters Patent is hereby corrected as shown below:

Column 6, line 1 claim 14, "staffer" should be changed to --starter--;
Column 6, line 2 claim 14, "staffer" should be changed to --starter--;
Column 6, line 3 claim 14, "staffer" should be changed to --starter--;
Column 6, line 5 claim 14, "staffer" should be changed to --starter--;
Column 6, line 19 claim 14, "staffer" should be changed to --starter--;
Column 6, line 20 claim 15, "staffer" should be changed to --starter--;
Column 6, line 21 claim 16, "staffer" should be changed to --starter--;
Column 6, line 24 claim 16, "staffer" should be changed to --starter--;
Column 6, line 26 claim 17, "staffer" should be changed to --starter--;
Column 6, line 30 claim 18, "staffer" should be changed to --starter--.

Signed and Sealed this

Ninth Day of October, 2007

JON W. DUDAS
*Director of the United States Patent and Trademark Office*